United States Patent [19]

Persson

[11] Patent Number: 4,802,722
[45] Date of Patent: Feb. 7, 1989

[54] LIGHTPEN

[75] Inventor: Sven A. R. Persson, Hägersten, Sweden

[73] Assignee: Telefonaktiebolaget L M Ericsson, Stockholm, Sweden

[21] Appl. No.: 934,393

[22] PCT Filed: Feb. 24, 1986

[86] PCT No.: PCT/SE86/00078

§ 371 Date: Oct. 22, 1986

§ 102(e) Date: Oct. 22, 1986

[87] PCT Pub. No.: WO86/05280

PCT Pub. Date: Sep. 12, 1986

[51] Int. Cl.⁴ .......................... G02B 1/04; G02B 6/00
[52] U.S. Cl. .................. 350/96.10; 350/96.24
[58] Field of Search ............... 350/96.10, 96.24, 96.25, 350/96.26

[56] References Cited

U.S. PATENT DOCUMENTS

| | | | |
|---|---|---|---|
| 3,010,357 | 11/1961 | Hirschowitz | 350/96.26 |
| 3,740,113 | 6/1973 | Cass . | |
| 3,942,866 | 3/1976 | Roman . | |
| 3,995,934 | 12/1976 | Nath . | |
| 4,354,734 | 10/1982 | Nakahashi | 350/96.26 |
| 4,398,790 | 8/1983 | Righini et al. . | |
| 4,483,585 | 11/1984 | Takami | 350/96.24 |
| 4,588,294 | 5/1986 | Siegmund | 350/96.26 |

FOREIGN PATENT DOCUMENTS

| | | |
|---|---|---|
| 0058574 | 8/1982 | European Pat. Off. . |
| 2424620 | 12/1975 | Fed. Rep. of Germany . |
| 2529339 | 9/1983 | Fed. Rep. of Germany . |
| 1405508 | 5/1965 | France . |
| 0097504 | 6/1982 | Japan .................. 350/96.24 |
| 141283 | 10/1979 | Norway . |
| 1321783 | 6/1973 | United Kingdom . |

Primary Examiner—John Zazworsky
Attorney, Agent, or Firm—Roberts, Spiecens & Cohen

[57] ABSTRACT

An optical cable is provided which is especially adapted for use in reading optical information from an optical information carrier. The cable includes a light conductor adapted for transmitting light from the information carrier to a light-sensitive receiver. The light conductor includes a major portion of an easily bendable material such as a plastic. It also includes an end portion extending beyond the major portion of the light conductor which faces away from the light-sensitive receiver. The end portion constitutes a separate light conductor, the reception angle of which is less than the corresponding angle of the major portion. The end portion is preferably fabricated of glass or quartz. The arrangement may be such that there is a plurality of further conductors positioned about the first said conductor and also manufactured of an easily bendable material.

15 Claims, 1 Drawing Sheet

LIGHTPEN

FIELD OF THE INVENTION

The invention relates to an optical cable adapted to be used in reading an optical information carrier, the cable containing a light conductor for transferring light from the information carrier to a light-sensitive receiver.

BACKGROUND

Light conductors have different properties with relation to flexibility, light divergence angle, and reception angle depending on what material they are made from. These angles are equally as great for a given light conductor and represent the angle within which the light can be spread from, or collected by, the end of the light conductor. A plastic optical fibre is relatively pliant and generally has a comparatively large light divergence angle. Fibres having a comparatively small light divergence angle are usually manufactured from glass or quartz. However, such fibres are not as pliant as plastic fibres and, furthermore, they are more easily damaged by bending. As an example of the magnitude of the light divergence and light reception angle, it may be stated that in a plastic fibre this is usually between 45° and 90°, while the corresponding angle for a glass or quartz fibre is usually only about 15° to 40°.

In the G.B. specification No. 1,375,963 there is described an optical cable intended for use in reading an optical information carrier. The cable contains a plurality of fibre conductors, of which the majority are utilized for illuminating the information carrier, and one is utilized for transmitting the light reflected from the carrier to a light-sensitive receiver.

If the information carrier is a display screen, no further illumination thereof is necessary, and thus no fibres are required which lead light to it. Irrespective of how the information carrier is illuminated, however, it is desirable that the so-called reading fibre, i.e. the fibre which transmits light from the information carrier to the light-sensitive receiver, have a small light reception angle. Good resolution is obtained in such a case, which is important for reading information such as bar codes.

SUMMARY OF INVENTION

An object of the present invention is to provide an optical cable which is easy to bend, while at the same time being characterized by being able to take up light from an information carrier within a comparatively small angle.

In achieving the above and other objects and advantages of the invention, there is provided an optical cable adapted for use in reading an optical information carrier. This cable comprises a light conductor adapted for transmitting light from the information carrier to a light-sensitive receiver, the light conductor including a major portion of an easily bendable material, there being furthermore provided an end portion facing away from the light sensitive receiver and comprising a separate light conductor, the light reception angle of which is less than the corresponding angle of the said major portion for obtaining good resolution. According to a particular embodiment, the major portion is of a plastic material and the end portion is of glass or quartz. Preferably, the light reception angle of the end portion is about 15° to 40° and the corresponding angle of the aforesaid major portion is about 45°-90°.

The above and other objects, features and advantages of the invention will be found in the Detailed Description of the invention which follows hereinbelow.

The invention will next be described in detail with reference to the accompanying drawing, in which.

DETAILED DESCRIPTION

Figure 1:
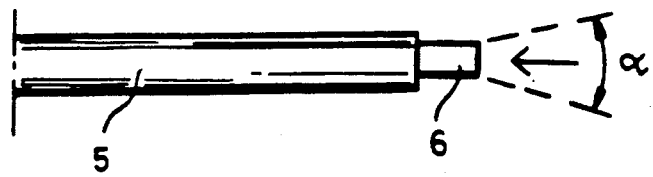
FIG. 1 is a side elevational view of an optical cable; provided in accordance with the invention.

A side elevation of an optical cable is shown in FIG. 1. The cable is intended for use in reading from an information carrier such as a display screen and comprises a light conductor denoted by the numeral 5 for transmitting light from the screen to a light-sensitive receiver. The light conductor 5 mainly comprises an optical fibre made from an easily bendable material with a comparatively large light reception angle. The conductor end portion 6 facing towards the screen comprises a fibre from a material with a comparatively small light reception angle $\alpha$. The easily bendable and major portion of the light conductor 5 can be made from a plastic, e.g. polymethyl methacrylate, and the end portion 6 from glass or quartz.

The illustrated cable can thus be easily bent and wound into a helix shape. Since the end portion 6 of the light conductor 5 has a small light reception angle, there is obtained better resolution in reading than if this had also been made from a more easily bendable material with a greater light reception angle.

Figure 2:
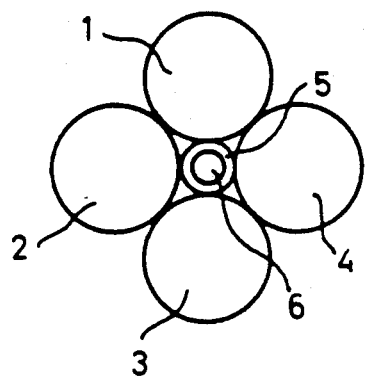
FIG. 2 is an end elevational view of the light conductors in an optical cable comprising several light conductors.
Figure 3:
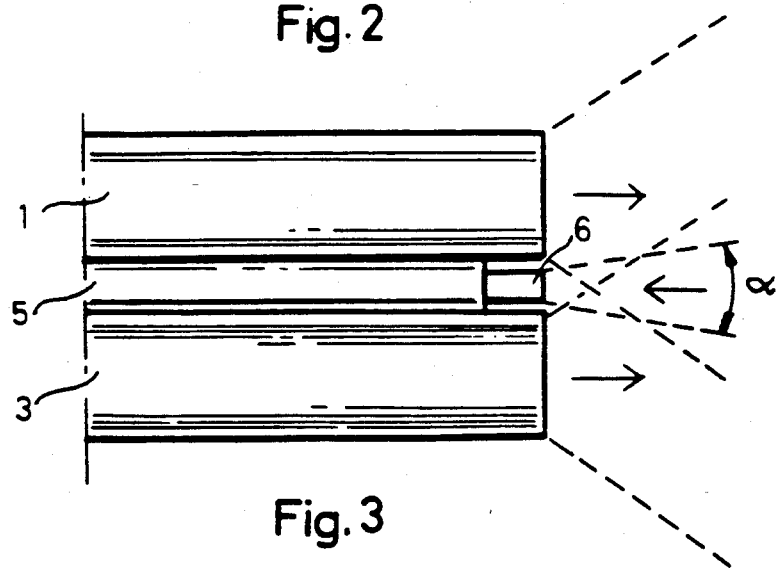
FIG. 3 is a side elevational view of certain of the light conductors in the cable according to FIG. 2.

FIG. 2 is an end elevation of the light conductors in an optical cable containing several light conductors, and FIG. 3 is a side elevation of certain of these conductors. They comprise fibre optical fibres 1–5, of which the fibres 2 and 4 have been omitted from FIG. 3, for the sake of clarity. The fibre 5 with its end portion 6 corresponds to the fibre according to FIG. 1. The fibres 1–4 are manufactured from an easily bendable material with a comparatively large light divergence angle. These fibres extend along the sides of the fibre 5 and are utilized for illuminating an optical information carrier, which does not generate light itself. The fibre 5 thus catches the reflected light at its end portion 6 and transmits it to a light-sensitive receiver at the other end of the fibre. Light directions and approximate light angles are indicated by arrows and dashed lines in FIG. 3.

Since the cable according to FIGS. 2 and 3 also contains light conductors of an easily bendable material, except the end portion 6, the same advantages are obtained with reference to flexibility and resolution as with the embodiment according to FIG. 1. The fibres 1–4, intended for illumination, also spread the light relatively uniformly on the information carrier, as a result of their comparatively large light divergence angles.

In the afore-described structure it will be noted that the preferred embodiment includes an arrangement whereby the major portion of the light conductor 5 and the end portion 6 are co-axial and it will be further noted that the end portion extends beyond the major portion. It will further be noted that the major portion and the end portion are of circular cross-section. Still further, it will be seen that the additional light conductors positioned about the central light conductor are arranged relative to the end portion such that the further light conductors and the end portion terminate at least approximately at a common plane.

With the illustrated embodiments there is thus obtained a cable which is durable and easy to bend, while having good optical properties at the same time. Of course, the invention can be further varied within the scope of the following claims. For example, the number of the light conductors and thus their interrelating dimensions may be varied. Fabrication material other than those given above is also conceivable.

What is claimed is:

1. An optical cable adapted for use in reading an optical information carrier, said cable comprising a light conductor adapted for transmitting light from the information carrier to a light-sensitive receiver, the light conductor including a major portion consisting of an optical fibre made of an easily bendable material and having an end face, and an end portion secured to and projecting from said end face of said major portion in a direction facing away from the light-sensitive receiver and consisting of a separate optical fibre, the light reception angle ($\alpha$) of which, for obtaining good resolution, is less than the corresponding angle of the said major portion.

2. An optical cable as claimed in claim 1, wherein said major portion is a fibre of plastic and said end portion is a fibre of glass or quartz.

3. An optical cable as claimed in claim 1, comprising a plurality of further light conductors, and which are utilized for illuminating the information carrier, each one of said further conductors consisting of an optical fibre made of an easily bendable material.

4. An optical cable as claimed in claim 3, wherein said further light conductors have a light divergence angle which is greater than the corresponding angle of said end portion.

5. An optical cable as claimed in claim 3 or 4, wherein said further light conductors are made of plastic.

6. An optical cable as claimed in claim 5, wherein the light reception angle of said end portion (6) is about 15° to 40°, and the corresponding angle of the further light conductors is about 45° to 90°.

7. An optical cable as claimed in claim 1 wherein the major portion and end portion are co-axial and the end portion extends from said major portion.

8. An optical cable as claimed in claim 7 wherein the optical fibres of said major and end portions are of circular cross section, said major portion having a greater diameter than that of said end portion.

9. An optical cable as claimed in claim 7 comprising further light conductors positioned about the first said light conductor, said further conductors and said end portion of the first conductor terminating at least approximately at a common plane.

10. An optical cable as claimed in claim 9 wherein all of said light conductors are of plastic and said end portion is of glass or quartz.

11. An optical cable as claimed in claim 9 wherein all of said light conductors are parallel.

12. An optical cable as claimed in claim 1 or 2, wherein said optical fibre of said end portion has a light reception angle of about 15° to 40°, and the optical fibre of the major portion of the light conductor has a light reception angle of about 45° to 90°.

13. An optical cable adapted for use in reading an optical information carrier and for transmitting light from the information carrier to a light sensitive receiver, said cable comprising a flexible major portion consisting of a first optical fibre made of an easily bendable material, said optical fibre having an end face, and a second optical fibre secured to said end face of the first optical fibre and projecting coaxially therefrom as a cylindrical tip with a planar end surface, said second optical fibre having a light reception angle which is less than the light reception angle of said first optical fibre to promote resolution of the information read on the information carrier, the combination of said two optical fibres constituting a cable means which is substantially flexible over its length for transmitting light and information at high resolution from the information carrier to the receiver.

14. An optical cable as claimed in claim 13 wherein said cylindrical tip has a smaller diameter than that of said first optical fibre.

15. An optical cable as claimed in claim 14 further comprising a plurality of light conductors coaxially arranged around said first optical fibre, said light conductors each consisting of an optical fibre of easily bendable material, said light conductors having end faces in substantial alignment with the end surface of said second optical fibre of the cable means, said optical fibres of the light conductors having light reception angles greater than that of said second optical fibre.

* * * * *